UNITED STATES PATENT OFFICE.

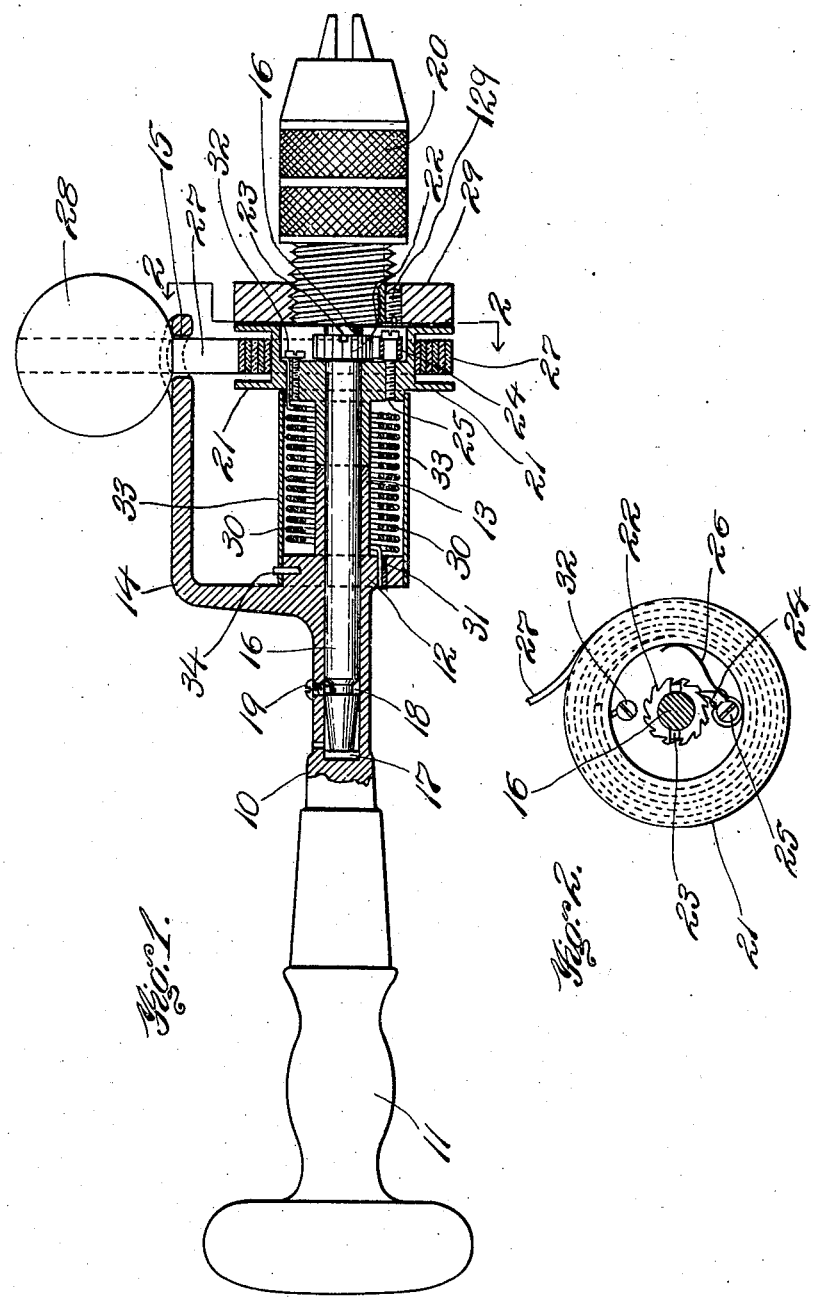

CHARLES W. KOHLER, OF ARLINGTON, AND THOMAS E. O'BRIEN, OF WATERTOWN, MASSACHUSETTS; SAID KOHLER ASSIGNOR TO SAID O'BRIEN.

RATCHET-DRILL.

No. 874,410.    Specification of Letters Patent.    Patented Dec. 24, 1907.

Application filed July 5, 1904. Serial No. 215,207.

*To all whom it may concern:*

Be it known that we, CHARLES W. KOHLER and THOMAS E. O'BRIEN, of Arlington and Watertown, respectively, in the county of Middlesex and State of Massachusetts, have invented certain new and useful Improvements in Ratchet-Drills, of which the following is a specification.

This invention relates to ratchet drills and its object is to provide such a construction as will reduce the number of parts, simplify, condense and compact the organization of parts, and enable these parts to be made of less expensive materials than heretofore and by less expensive mechanical operations.

Of the accompanying drawings,—Figure 1 represents a longitudinal section of a ratchet drill embodying our improvements. Fig. 2 represents a section on line 2—2 of Fig. 1.

The same reference characters indicate the same parts in both figures.

In the drawings, 10 is a frame preferably made of malleable cast iron having its rear end fixed in a suitable handle 11. This frame is formed with an integral cylindrical boss 12 and forward of this boss with a reduced portion 13. Back of the boss the frame is formed with an integral arm 14 having at its forward end an eye 15 constituting a band-guide as hereinafter explained.

16 is a spindle journaled within the bore of the frame 10 and stepped on a hardened plate 17 at the bottom of the bore, said spindle having a circumferential groove 18 just forward of its rear end occupied by the end of a screw 19 for holding the spindle against outward axial movement. At the forward end of the spindle is mounted a chuck 20 for holding the drill or other tool.

21 is a drum loosely journaled wholly on the spindle 16 and recessed at its forward end to receive a one-way-acting clutch comprising a ratchet 22 grooved across its face to receive a coupling-pin 23 on the spindle 16, and a pawl 24 pivoted upon a screw 25 which screws into the drum, and provided with a spring 26 riveted to the pawl and bearing against the wall of the recess in the drum for yieldingly forcing the pawl into engagement with the ratchet. The drum is encircled between its flanges by a band or strap 27 attached at one end to the drum and normally enwrapping the same in several convolutions, said band passing through eye 15 of guide-arm 14 and having at its outer end a ball 28.

29 is a knurled collar attached to the spindle by being threaded to the rear end of the body of chuck 20 and secured by a key-screw 129, said collar being grasped to manually arrest or hold the chuck-body while the case of the chuck is manipulated to tighten or loosen the jaws. This collar and the end of the chuck together form a head or boss on the spindle which constitutes a cover or closure for the recess in the forward face of the drum 21.

30 is a helical spring having one end fixed in the boss 12 by a pin 31 driven alongside of its inturned end and the other end fixed in the drum 21 by a screw 32 screwing alongside of the out-turned end of the spring. The drum 21 abuts the forward end or reduced portion 13 of the frame 10 and the spring 30 is external to said drum as will be seen.

As may be clearly seen from the drawing the spring is formed helically having a plurality of windings, one being adjacent the reduced portion of the frame and drum while the others are superposed upon it in successive convolutions. This provides for the insertion of a comparatively great length of spring in a small compass, by which the possibility of a considerable amount of motion may be given to the spindle without requiring the use of a bulky chamber in which to include the spring, and thus the shape and dimensions of the tool are convenient and compact. Such a construction also causes the spring to expand quickly and immediately engage the stationary casing when the spindle is rotated in the wrong direction, and thereby to prevent so great a rotation as would cause the spring to be broken at its point of connection either with the frame or the drum, such as occasionally happens in cases where there is no stationary cover or casing surrounding the spring.

33 is a cylindrical casing fixed by means of rivets 34 to the boss 12 and inclosing spring 30 for the purpose of protecting the latter from dust, etc.

The operation will be evident from the foregoing description, it being understood that a working rotation is imparted to the spindle 16 by pulling outwardly on the band 27, the drum 21 acting through the ratchet-and-pawl clutch 22 24 to transmit its rotation to the spindle. The spring 30 returns the drum in the opposite direction.

It will be seen that the tool as thus constructed embodies a minimum number of parts and can be made by inexpensive mechanical operations. As the drum 21 has its whole journal or radial bearing on the spindle 16 and not upon the exterior of the frame 10, it is unnecessary to finish the periphery of said frame for a bearing. The drum itself can be either cast or turned out from a bar. By removing screw 19 the spindle 16 may be withdrawn, carrying with it chuck 20, collar 29 and pin 23. The ratchet 22 may be slipped off over the end of the spindle after the spindle has been withdrawn from the frame without removing the pin 23, although it will be understood that the ratchet may be positively pinned to the spindle if desired. In place of the ratchet having a large number of teeth, a simpler device, consisting of a pin, like the pin 23 widened, projecting from opposite sides of the spindle and constituting in effect a two-toothed ratchet may be substituted. Upon removing screw 32 the drum 21 can be separated from spring 30, and the removal of other parts may easily be effected as will be evident.

It will be seen that the ratchet 22 acts as an abutment limiting the outward axial movement of the drum 21, thus avoiding the necessity for employing a separate collar or shoulder at this point.

We claim:—

1. A ratchet drill comprising a frame having a handle and a longitudinal bore and formed adjacent its end with a boss and a reduced portion concentric with the bore, a spindle journaled in the bore, a drum journaled on the spindle and formed with a reduced portion of substantially the same diameter as the reduced portion of the frame abutting against the same, a spring connected at its ends to said boss and coiled about the said reduced portions, a casing mounted externally on the boss and inclosing the spring, means attached to the drum for rotating the same in opposition to the tension of the spring, and a ratchet and pawl connection between the spindle and drum.

2. A ratchet drill comprising a frame having a handle and a longitudinal bore and formed adjacent its end with a boss and a reduced portion concentric with the bore, a spindle journaled in the bore, a drum journaled on the spindle recessed at its forward end and formed at its other end with a reduced portion of substantially the same diameter as the reduced portion of the frame abutting against the same, a spring connected at its ends to said boss and coiled about the said reduced portions, a casing mounted externally on the boss and inclosing the spring, means attached to the drum for rotating the same in opposition to the tension of the spring, and a ratchet and pawl clutch mounted in the recess on the drum for connecting the drum and spindle.

3. A ratchet drill comprising a frame having a handle and a longitudinal bore and formed adjacent its end with a boss and a reduced portion concentric with the bore, a spindle journaled in the bore, a drum journaled on the spindle and formed with a reduced portion of substantially the same diameter as the reduced portion of the frame abutting against the same, a spring connected at its ends to said boss and coiled about the said reduced portions, a casing mounted externally on the boss and inclosing the spring, a band attached to the drum for rotating the same, flanges formed on the drum adjacent opposite edges of the band and separated by approximately the width of the band, the drum being also formed with a recess at its forward end, a ratchet fixed on the spindle in said recess, and a pawl mounted on the drum in said recess and arranged to engage the ratchet for connecting the drum and spindle.

4. In a ratchet drill, the combination of a frame having a handle, a spindle journaled in said frame, a drum journaled on said spindle and recessed at its forward end, a ratchet-and-pawl clutch mounted in said recess for connecting the drum and spindle, a chuck member, a head or boss on the spindle forward of the drum fixed to the chuck member and constituting both a cover for the recess in the drum and a holder for retaining the chuck stationary while inserting or removing a tool, means for rotating the drum, a casing surrounding a part of the drum, and a spring external to the drum and within the casing for returning the drum when released by said rotating means.

5. In a ratchet drill, a frame having a handle, a boss and an internal bore, a spindle journaled in the bore, a drum journaled thereon and formed with a portion abutting against a portion of the frame, a clutch detachably connecting the drum and spindle, a stationary casing mounted on the boss and extending over a portion of the drum, and a spring contained in the space between the casing, the drum and the boss, being attached at its ends to the drum and boss and coiled helically about the spindle in a plurality of concentric windings, one winding being outside of another.

In testimony whereof we have affixed our signatures, in presence of two witnesses.

CHARLES W. KOHLER.
THOMAS E. O'BRIEN.

Witnesses:
R. M. PIERSON,
A. C. RATIGAN.